US012060970B2

(12) United States Patent
Ahn et al.

(10) Patent No.: US 12,060,970 B2
(45) Date of Patent: Aug. 13, 2024

(54) VEHICLE CONTROL APPARATUS AND METHOD USING SWIVEL OPERATION OF SMART DEVICE

(71) Applicant: HYUNDAI MOBIS CO., LTD., Seoul (KR)

(72) Inventors: Sung Joon Ahn, Seongnam-si (KR); Tae Hun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 271 days.

(21) Appl. No.: 17/667,775

(22) Filed: Feb. 9, 2022

(65) Prior Publication Data

US 2022/0252219 A1 Aug. 11, 2022

(30) Foreign Application Priority Data

Feb. 9, 2021 (KR) ........................ 10-2021-0018693

(51) Int. Cl.

| | |
|---|---|
| ***G06F 3/048*** | (2013.01) |
| ***B60K 35/00*** | (2006.01) |
| ***F16M 13/02*** | (2006.01) |
| ***G06F 1/16*** | (2006.01) |
| *B60K 35/10* | (2024.01) |
| *B60K 35/22* | (2024.01) |

(52) U.S. Cl.

CPC ........... *F16M 13/022* (2013.01); *B60K 35/00* (2013.01); *G06F 1/1652* (2013.01); *B60K 35/10* (2024.01); *B60K 35/223* (2024.01); *B60K 2360/11* (2024.01)

(58) Field of Classification Search

CPC .. F16M 13/022; B60K 35/00; B60K 2370/11; B60K 2370/1533; G06F 1/1652

See application file for complete search history.

(56) References Cited

U.S. PATENT DOCUMENTS

| | | | | |
|---|---|---|---|---|
| 7,683,771 | B1 * | 3/2010 | Loeb | B63B 49/00 701/1 |
| 8,818,624 | B2 * | 8/2014 | Small | G06F 3/04886 701/487 |
| 9,513,702 | B2 * | 12/2016 | Cho | G06F 3/1423 |
| 9,552,148 | B2 * | 1/2017 | Kim | G06F 3/04817 |
| 9,880,731 | B1 * | 1/2018 | Wang | G06F 1/163 |
| 10,019,052 | B2 * | 7/2018 | Lee | G06F 3/01 |
| 10,037,052 | B2 * | 7/2018 | Stotler | G06F 3/016 |
| 10,311,715 | B2 * | 6/2019 | Jopling | G06F 3/0488 |
| 10,318,061 | B2 * | 6/2019 | Franklin | H04M 1/0268 |
| 10,372,164 | B2 * | 8/2019 | Huitema | G06F 3/0346 |
| 11,360,728 | B2 * | 6/2022 | Kim | G06F 3/04883 |

(Continued)

OTHER PUBLICATIONS

Sang Hun Lee, User interface for in-vehicle systems with on-wheel finger spreading gestures and head-up displays, Jun. 19, 2020, Journal of Computational Design and Engineering, 2020 (Year: 2020).*

*Primary Examiner* — David Phantana-angkool
(74) *Attorney, Agent, or Firm* — NovoTechIP International PLLC

(57) ABSTRACT

A vehicle control system using a swivel operation of a smart device may include: a smart device mounted on a holder within a vehicle; and a control unit configured to receive swivel data according to a swivel operation performed to the smart device, and change and display a vehicle function control screen.

12 Claims, 27 Drawing Sheets

(56) References Cited

U.S. PATENT DOCUMENTS

| | | | | |
|---|---|---|---|---|
| 11,914,835 | B2 * | 2/2024 | Jeong | G06F 3/013 |
| 2002/0085043 | A1 * | 7/2002 | Ribak | B60W 50/14 715/810 |
| 2006/0052144 | A1 * | 3/2006 | Seil | H04B 1/38 455/90.3 |
| 2010/0238280 | A1 * | 9/2010 | Ishii | G02B 27/01 348/77 |
| 2010/0318266 | A1 * | 12/2010 | Schaaf | B60N 2/0228 701/49 |
| 2011/0082620 | A1 * | 4/2011 | Small | B60K 37/06 701/31.4 |
| 2014/0019913 | A1 * | 1/2014 | Newman | G06F 3/0488 715/810 |
| 2014/0101560 | A1 * | 4/2014 | Kwak | G06F 3/0488 715/788 |
| 2015/0153936 | A1 * | 6/2015 | Lim | G06F 3/0482 715/716 |
| 2016/0306393 | A1 * | 10/2016 | Huitema | G06F 1/1643 |
| 2017/0032214 | A1 * | 2/2017 | Krenzer | G06V 40/18 |
| 2018/0024725 | A1 * | 1/2018 | Penilla | G07C 5/085 701/49 |
| 2018/0170354 | A1 * | 6/2018 | Lee | B60K 35/00 |
| 2019/0042063 | A1 * | 2/2019 | Mizuno | G06F 3/04892 |
| 2019/0121522 | A1 * | 4/2019 | Davis | G06V 40/28 |
| 2019/0232787 | A1 * | 8/2019 | Tane | G02B 30/35 |
| 2019/0278454 | A1 * | 9/2019 | Washeleski | G06F 3/0416 |
| 2020/0257418 | A1 * | 8/2020 | Strandberg | G06F 3/0484 |
| 2021/0155079 | A1 * | 5/2021 | Ono | G06F 3/04847 |
| 2021/0197843 | A1 * | 7/2021 | Shimamoto | G05D 1/0016 |
| 2021/0229555 | A1 * | 7/2021 | Salahat | B60W 50/0098 |
| 2022/0024312 | A1 * | 1/2022 | Kim | H04M 1/72454 |
| 2022/0113852 | A1 * | 4/2022 | Strandberg | G06F 3/0484 |
| 2022/0118851 | A1 * | 4/2022 | Kim | B60K 35/00 |
| 2022/0144088 | A1 * | 5/2022 | Tanaka | B60R 11/02 |
| 2022/0203945 | A1 * | 6/2022 | Yeom | B60K 35/00 |
| 2022/0219604 | A1 * | 7/2022 | Ma | B60K 35/00 |
| 2022/0252219 | A1 * | 8/2022 | Ahn | F16M 13/022 |
| 2023/0373304 | A1 * | 11/2023 | Duerr | B60K 37/06 |

* cited by examiner

VEHICLE CONTROL APPARATUS AND METHOD USING SWIVEL OPERATION OF SMART DEVICE

CROSS-REFERENCE TO RELATED APPLICATIONS

This application claims the benefit under 35 USC § 119(a) of Korean Patent Application No. 10-2021-0018693, filed on Feb. 9, 2021 in the Korean Intellectual Property Office, the entire disclosure of which is incorporated herein by reference for all purposes.

BACKGROUND

1. Technical Field

The present disclosure relates to a vehicle control apparatus and method using a swivel operation of a smart device.

2. Discussion of Related Art

Considering a car sharing concept or low-price mobility vehicle, it is necessary to apply a UI (User Interface) which enables a user to manipulate various vehicle functions such as a driving safety function, through connection between the vehicle and the user's smart device.

In a future mobility vehicle to which a side-to-side movement function of a steering wheel is applied so that there is no boundary between a driver seat and a passenger seat, it is not easy to arrange buttons for lamp, wire and air-conditioning. Thus, a driving safety function also needs to be controlled through a user's smart device.

Since such a smart device has a limited screen area, the user may go through a plurality of steps during a process of accessing a screen for controlling additional convenient functions. However, in order to control a driving-related function, the user needs to immediately control the screen.

Since the smart device provides a display and touch function, the driving stability of the vehicle is degraded when a driver's gaze is dispersed. Thus, in order to manipulate various functions (AVN function, driving safety function, air-conditioning function and like) within the vehicle by using the smart device and to control functions which require immediacy, there is a need for a physical manipulation method capable of guaranteeing quick access.

A conventional voice recognition technology may also be used as a control method for executing a function within a vehicle without dispersing a driver's gaze. However, the vehicle recognition technology has low immediacy.

A conventional smart device is placed in a vehicle and only utilized to display navigation information, and does not suggest a method capable of quickly accessing a function control screen which requires immediacy for driving safety.

SUMMARY

Various embodiments are directed to a vehicle control apparatus and method which can rapidly access a screen for controlling various vehicle functions by using a swivel operation when a smart device and a vehicle display are connected to each other.

In an embodiment, a vehicle control apparatus using a swivel operation of a smart device may include: a smart device mounted on a holder within a vehicle; and a control unit configured to receive swivel information according to a swivel operation applied to the smart device, and change and display a vehicle function control screen.

The smart device may be mounted on the holder, and performs a steering wheel function.

The smart device may include a connection link, such that a partial area of the smart device is swiveled by rotation of the connection link.

The smart device may include a flexible display, and the control unit may recognize the swivel information acquired by a twist of the flexible display.

The control unit may change and display the vehicle function control screen, with the smart device rotated by the swivel operation.

With the smart device returned to a shape before rotation after the smart device is rotated by the swivel operation, the control unit may transmit a function execution command according to a signal inputted through the vehicle function control screen.

In an embodiment, a vehicle control method using a swivel operation of a smart device may include the steps of: (a) acquiring swivel information by checking a swivel state of a smart device; and (b) changing and displaying a vehicle function control screen according to the swivel state.

The step (a) may include receiving the swivel information of the smart device, acquired by rotation of a swivel rotating part included in a holder.

The step (a) may include receiving swivel information of a partial area of the smart device, the swivel information being acquired by rotation of a connection link included in the smart device.

The step (a) may include receiving the swivel information of the smart device including a flexible display, the swivel information being acquired by a twist of a screen of the smart device.

The step (b) may include changing and displaying the vehicle function control screen, with the smart device rotated by the swivel operation.

The step (b) may include transmitting a function execution command according to a signal inputted through the vehicle function control screen, with the smart device returned to a shape before rotation after the smart device is rotated by the swivel operation.

In an embodiment, a vehicle control system using a swivel operation of a smart device may include: an input unit configured to receive swivel information of a smart device within a vehicle; a memory configured to store a program for displaying a vehicle function control screen by using the swivel information; and a processor configured to execute the program. The processor may change and display the vehicle function control screen by using the swivel information.

The input unit may receive the swivel information of the smart device, acquired by rotation of a swivel rotating part included in a holder.

The input unit may receive swivel information of a partial area of the smart device, the swivel information being acquired by rotation of a connection link included in the smart device.

The input unit may receive the swivel information of the smart device including a flexible display, the swivel information being acquired by a twist of a screen of the smart device.

When the smart device including the flexible display may be mounted on a steering wheel including a rotating part, the input unit may receive the swivel information which is acquired as a user grabs and rotates the steering wheel.

The processor may change and display the vehicle function control screen, with the smart device rotated by the swivel operation.

With the smart device returned to a shape before rotation after the smart device is rotated by the swivel operation, the processor may transmit a function execution command according to a signal inputted through the vehicle function control screen.

In accordance with the present disclosure, the vehicle control apparatus and method can rapidly access a function control screen requiring immediacy through a physical manipulation without dispersing a driver's gaze, and enable a user to perform a steering manipulation and a swivel function manipulation on various smart devices.

The effects of the present disclosure are not limited to the above-mentioned effects, and the other effects which are not mentioned herein will be clearly understood from the following descriptions by those skilled in the art.

DETAILED DESCRIPTION

The above-described purpose of the present disclosure and the advantages and characteristics of the present disclosure and a method for achieving the advantages and characteristics will be clearly understood through embodiments to be described below in detail with reference to the accompanying drawings.

However, the present disclosure are not limited to the embodiments disclosed below, and may be embodied in various different forms. These embodiments are provided to make this disclosure thorough and complete and to fully convey the purpose, configuration and effect of the present disclosure to those skilled in the art to which the present disclosure pertains. The scope of the present disclosure is only defined by claims.

Terms used in this specification are used for describing exemplary embodiments while not limiting the present disclosure. The terms of a singular form may include plural forms unless particularly mentioned. The term such as "comprise" or "comprising" used in the specification specifies a component, step, operation and/or element, but does not exclude the presence or addition of other components, steps, operations and/or elements.

A vehicle control apparatus or system using a swivel operation of a smart device in accordance with an embodiment of the present disclosure includes a smart device held on a holder within a vehicle and a control unit configured to recognize swivel information acquired by a swivel operation applied to the smart device, and change and display a vehicle function control screen.

The smart device is mounted on the holder and performs a steering wheel function.

The smart device includes a connection link, and has a partial area which is swiveled by the rotation of the connection link.

The smart device includes a flexible display, and the control unit recognizes swivel information acquired by a twist of the flexible display.

With the smarted device rotated by a swivel operation, the control unit changes and displays the vehicle function control screen.

With the smart device returned to the shape before the rotation after the smart device is rotated by the swivel operation, the control unit transmits a function execution command according to a signal inputted through the vehicle function control screen.

FIGS. 1 to 9 illustrate structures for the swivel operation of the smart device in accordance with the embodiment of the present disclosure.

Figure 1A:
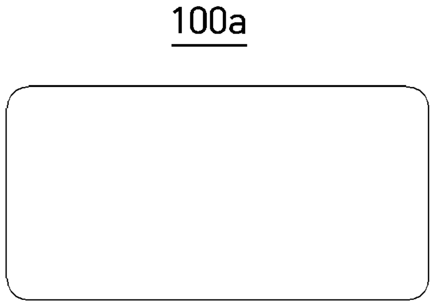
FIGS. 1A to 1C, 2A to 2C, 3A, 3B, 4A, 4B, 5A to 5C, 6A, 6B, 7A, 7B, 8A, 8B and 9A to 9C illustrate structures for a swivel operation of a smart device in accordance with an embodiment of the present disclosure.
Figure 1B:
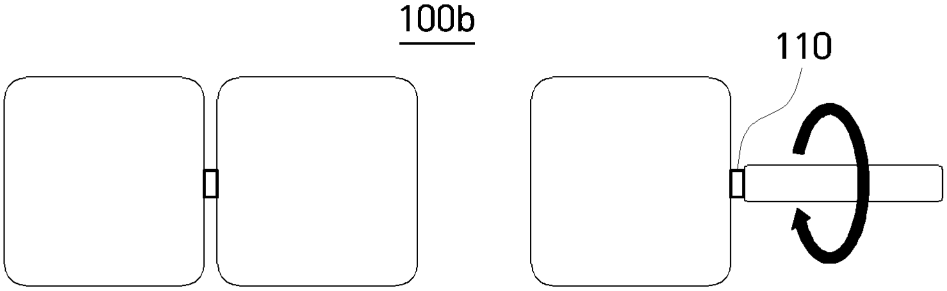
Figure 1C:
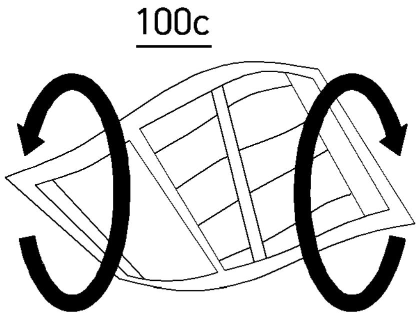

FIGS. 1A to 1C illustrate various structural shapes of the smart device in accordance with the embodiment of the present disclosure.

In the present embodiment, a general smart device 100*a* may be used as illustrated in FIG. 1A, a display separate-type smart device 100*b* may be used as illustrated in FIG. 1B, or a flexible smart device 100*c* may be used as illustrated in FIG. 1C.

Referring to FIG. 1B, the display separate-type smart device 100*b* is divided into preset areas which are connected through a rotatable connection link 110.

As illustrated in FIG. 1B, a swivel operation for each of the areas divided on the basis of the connection link 110 can be controlled.

Figure 2A:
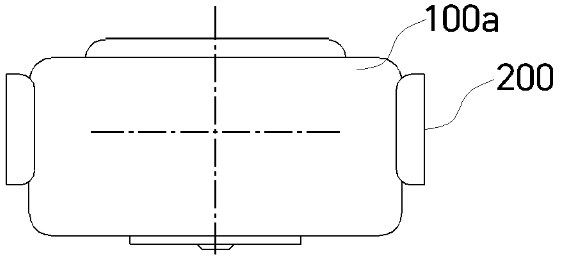

Referring to FIG. 2A, the smart device 100*a* is mounted on a holder 200 in a vehicle so as to perform a steering wheel function by itself.

A user can grab the mounted smart device itself with his/her hand so as to perform the steering wheel manipulation, and can perform a front/rear swivel operation on the basis of a driver and a dashboard. This operation will be described below with reference to FIGS. 3 and 4.

Figure 2B:
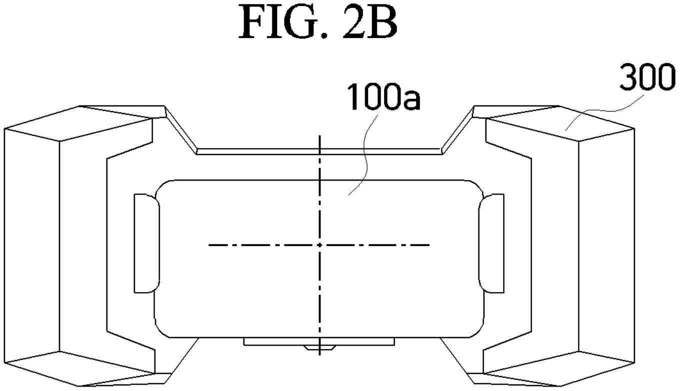
Figure 2C:
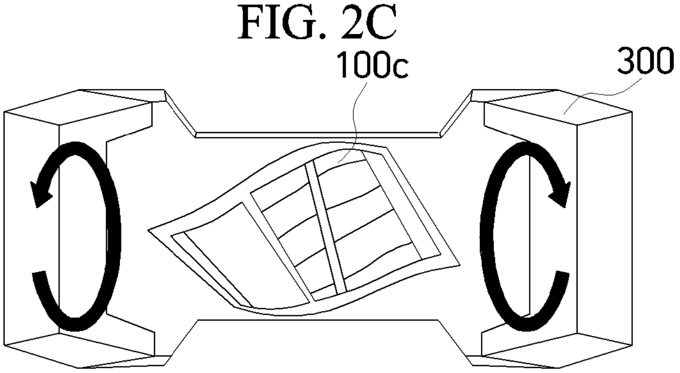

Referring to FIGS. 2B and 2C, the smart device 100*a* or 100*c* is mounted on a steering wheel 300, and a user may grab the smart device 100*a* or 100*c* mounted on the steering wheel 300 and perform a swivel operation, or grab the steering wheel 300 having the smart device 100*a* or 100*c* mounted thereon and perform a swivel operation.

In accordance with the embodiment of the present disclosure, the user may rotate the smart device or the steering wheel having the smart device mounted thereon at a predetermined angle by swiveling the smart device or the steering wheel, and manipulate the rotated smart device or the rotated steering wheel. With the smart device or the steering wheel returned to the basic shape at the angle before the rotation after the smart device or the steering wheel is rotated at the predetermined angle, the user can manipulate a function changed by the swivel operation.

Figure 3A:
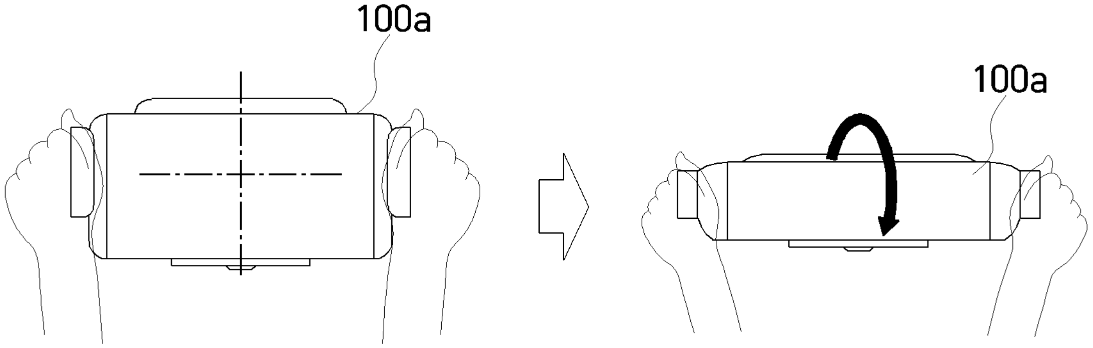

Referring to FIG. 3A, the user grabs the smart device 100*a* to manipulate the steering wheel. At this time, the user performs a swivel operation, with the smart device 100*a* grabbed by the user's hand as illustrated in FIG. 3A.

Figure 3B:
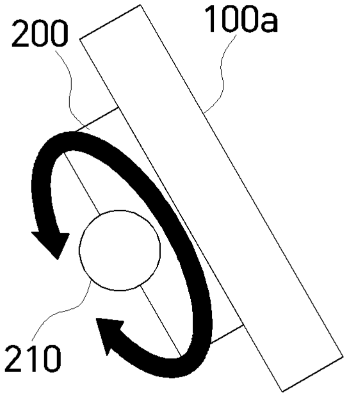

Referring to FIG. 3B, the smart device 100*a* is mounted on the holder 200, and the holder 200 has a swivel rotating part 210 installed thereon.

According to a swivel operation of the user, the smart device 100*a* and the holder 200 are rotated so that the screen of the smart device 100*a* is changed to a preset function control screen, and provides UI feedback.

Figure 4A:
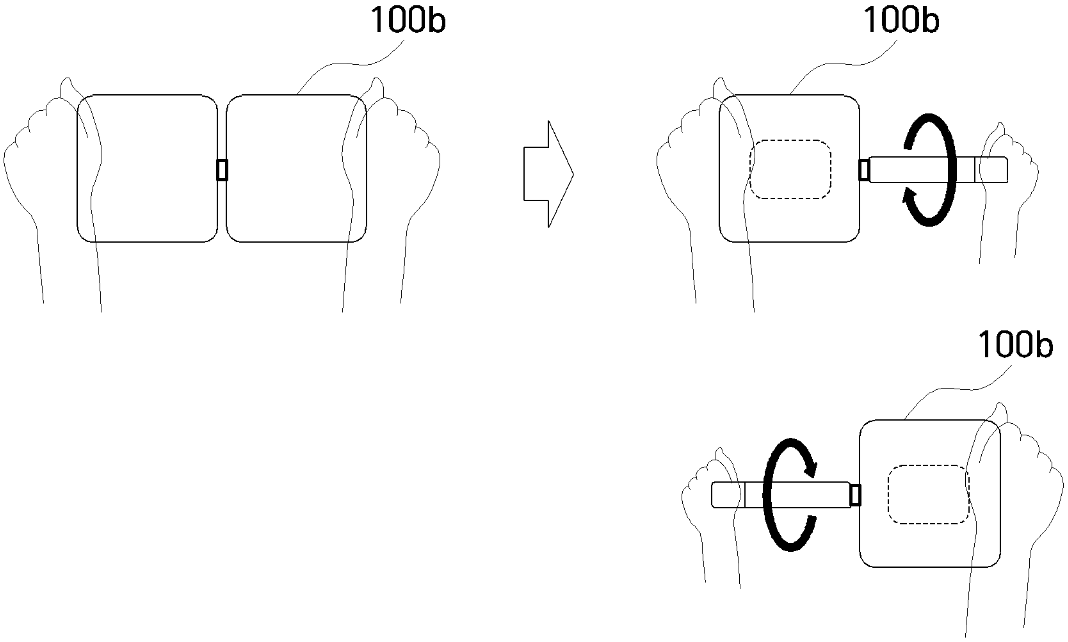

Referring to FIG. 4A, the user grabs the smart device 100*b* having the connection link 110 provided therein, and controls driving by manipulating the steering wheel. As illustrated in FIG. 4A, the user performs a swivel operation with the smart device 100*b* grabbed by the user's hand.

At this time, the user may fix a left area of the smart device 100*b*, and perform a swivel operation on a right area thereof. On the contrary, the user may fix the right area of the smart device 100*b*, and perform a swivel operation on the left area thereof.

Figure 4B:
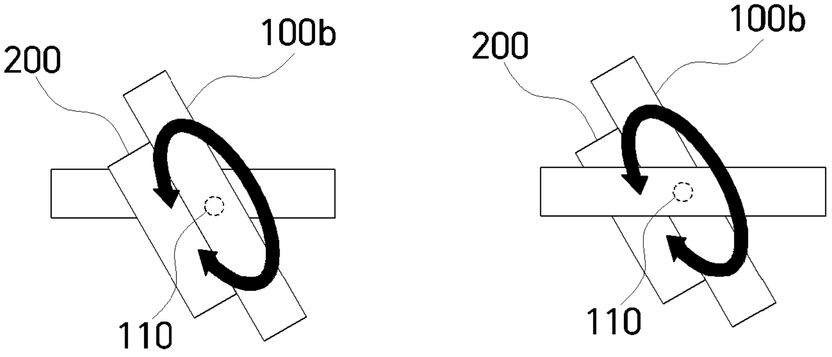

Referring to FIG. 4B, the user may perform the swivel operation on each of the divided areas of the smart device 100*b* through the connection link 110. Thus, the swivel operation on the smart device 100*b* mounted on the holder 200 can provide a UI for movement to a preset function control screen.

Figure 5A:
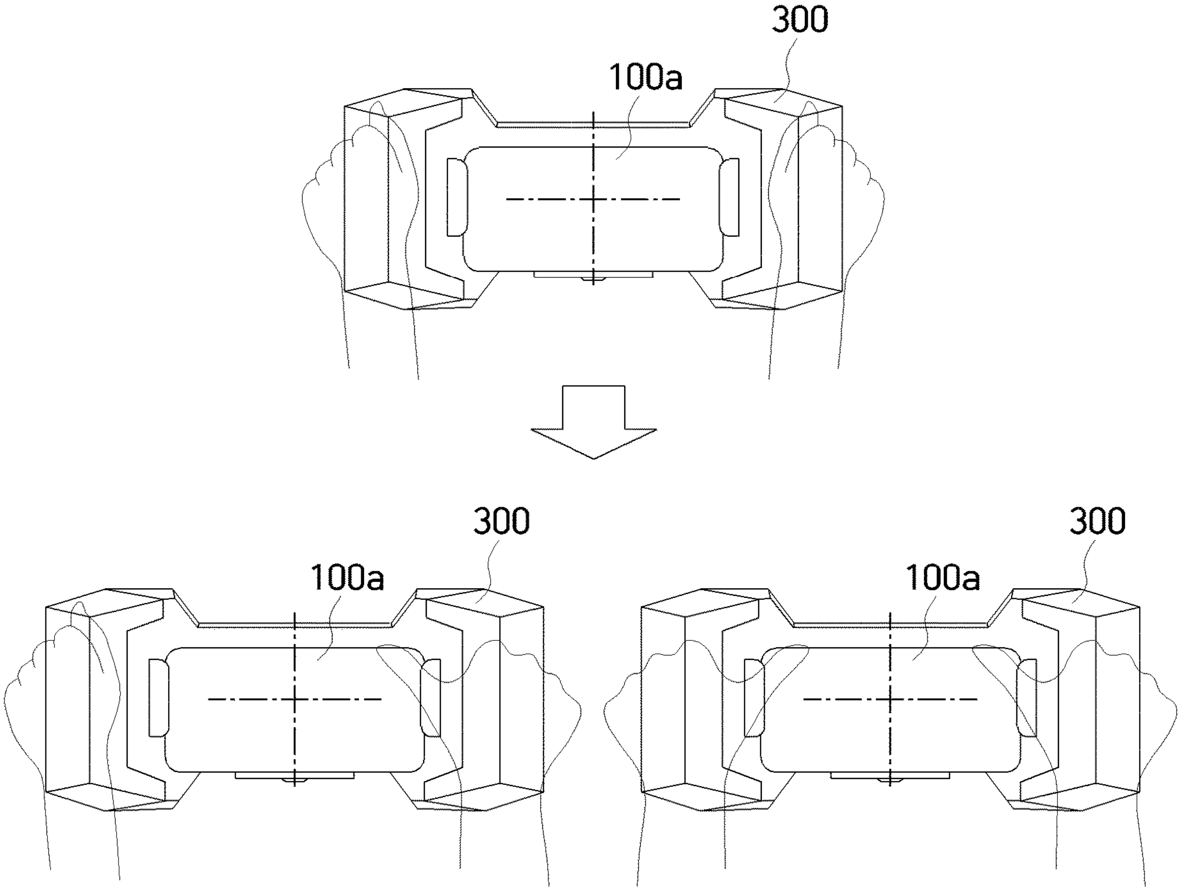

Referring to FIG. 5A, the user grabs the steering wheel 300 having the smart device 100*a* mounted thereon and controls driving. With the steering wheel 300 grabbed by the user's hand, the user performs a swivel operation on the smart device 100*a* by using his/her thumb.

Figure 5B:
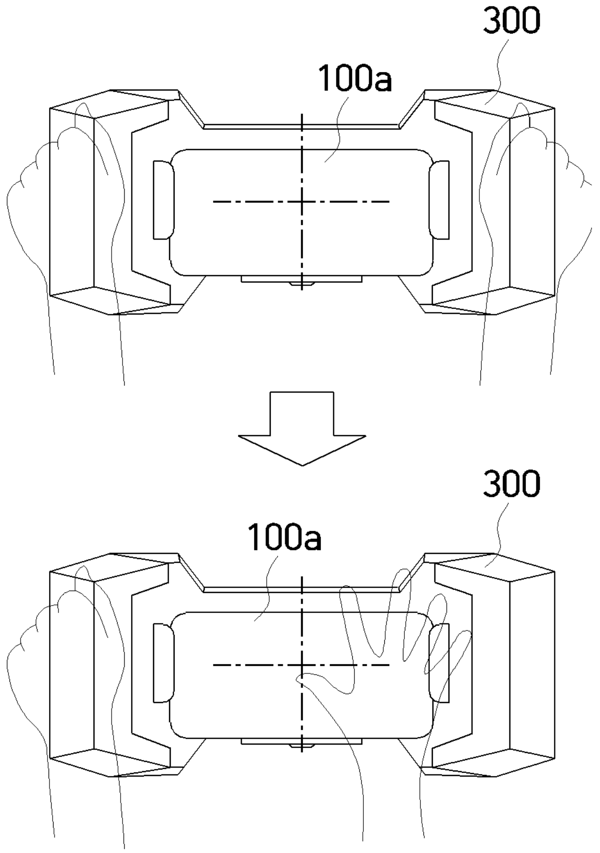

Referring to FIG. 5B, the user may directly grab the smart device 100*a*, and perform a swivel operation.

As described above, the user may rotate the smart device 100*a* at the predetermined angle by performing a swivel operation on the smart device 100*a* mounted on the steering wheel 300, and manipulate the rotated smart device 100*a*. With the smart device 100*a* returned to the basic shape at the angle before the rotation after the smart device 100*a* is rotated at the predetermined angle, the user can manipulate the function changed by the swivel operation. An elastic member is disposed to return the smart device to the basic shape after the swivel operation.

Figure 5C:
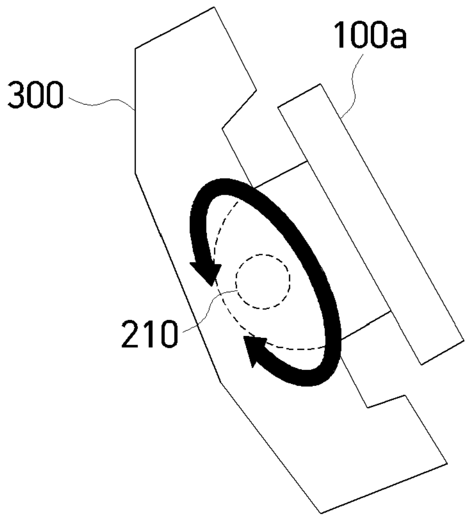

Referring to FIG. 5C, the smart device 100*a* is mounted on the holder 200, and the holder 200 has the swivel rotating part 210 installed therein.

That is, in the present embodiment, the steering wheel 300 itself is not swiveled, but the smarted device 100*a* mounted on the steering wheel 300 is swiveled to change the vehicle function control screen UI.

As described above, the user may rotate the smart device 100*a* at a predetermined angle by performing a swivel operation on the smart device 100*a* mounted on the steering wheel 300, and manipulate the rotated smart device 100*a*. With the smart device 100*a* returned to the basic shape at the angle before the rotation after the smart device 100*a* is rotated at the predetermined angle, the user can manipulate a function changed by the swivel operation. An elastic member is disposed on the swivel rotating part so as to return the smart device to the basic shape after the swivel operation.

Referring to FIGS. 6 and 7, the smart device 100*b* is mounted on the steering wheel 300, and the user grabs the steering wheel 300 having the smart device 100*b* mounted thereon and controls driving. At this time, the user can perform a swivel operation on the smart device 100*b* by using his/her thumb, with the steering wheel 300 grabbed by his/her hand, or directly grab the smart device 100*b* to perform the swivel operation.

The smart device 100*b* is a display separate-type smart device, and is divided into preset areas which are connected through the rotatable connection link 110.

Figure 6A:
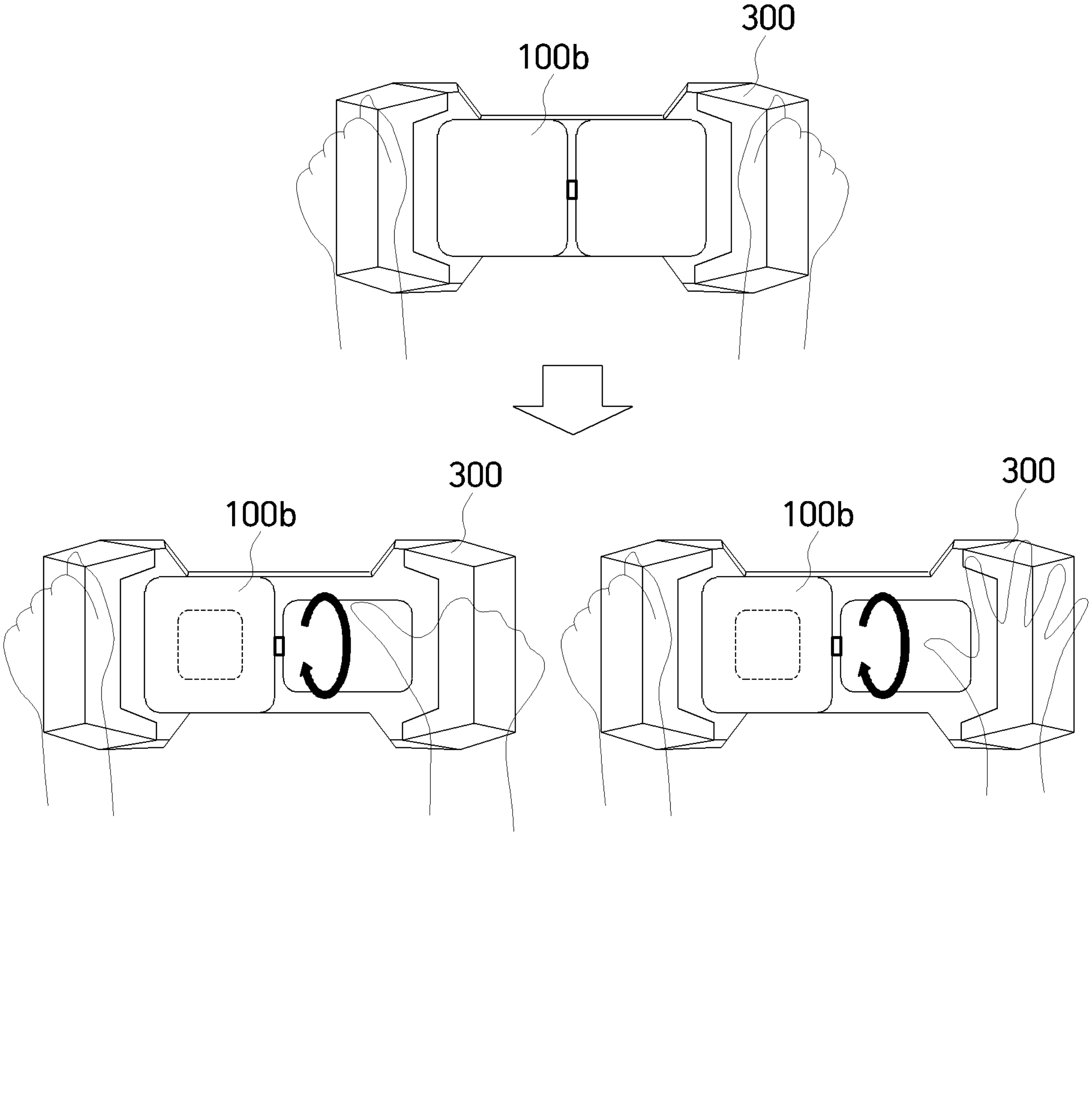
Figure 6B:
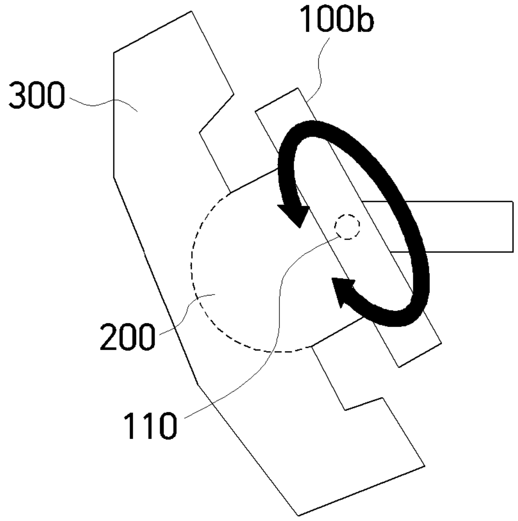
Figure 7A:
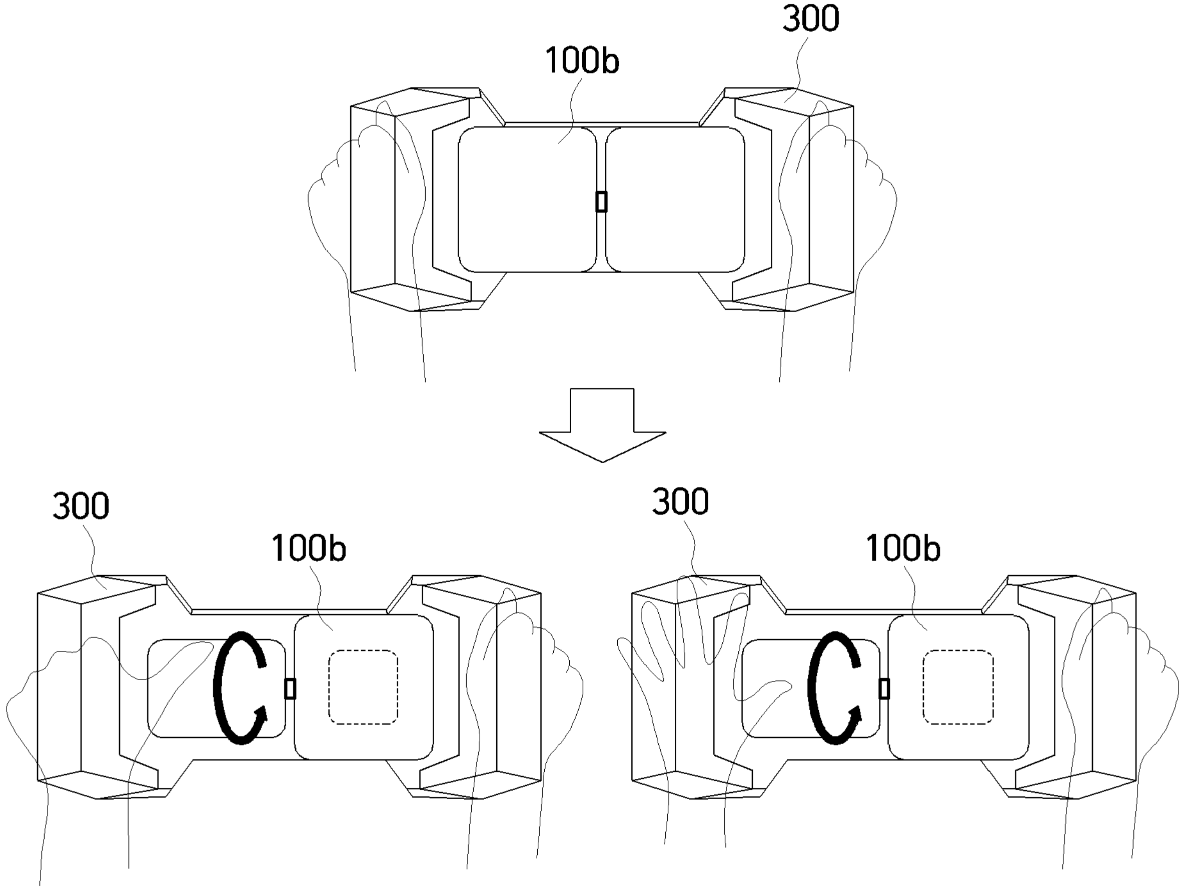

Therefore, as illustrated in FIGS. 6A and 6B, the user can swivel the right area of the smart device 100*b* while the left area thereof is fixed. On the contrary, as illustrated in FIGS. 7A and 7B, the user may swivel the left area of the smart device 100*b* while the right area thereof is fixed.

At this time, as a specific area is swiveled, a different vehicle function control screen is displayed.

Figure 7B:
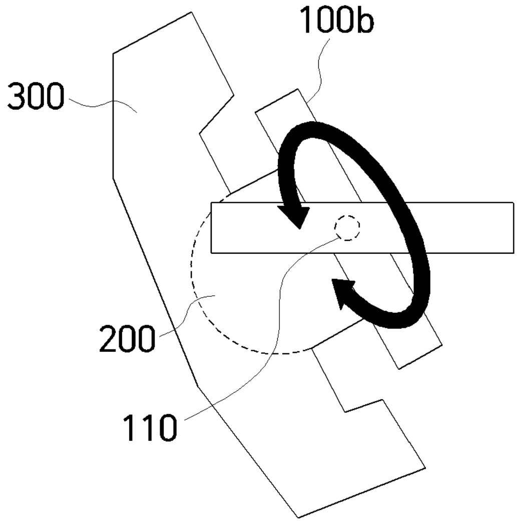

Referring to FIGS. 6B and 7B, the smart device 100*b* is mounted on the steering wheel 300 by the holder 200, and a predetermined area of the smart device 100*b* is swiveled by the connection link 110.

The user may rotate the smart device 100*b* at a predetermined angle by performing a swivel operation on the smart device 100*b*, with the smart device 100*b* mounted on the steering wheel 300, and manipulate the rotated smart device 100*b*. With the smart device 100*b* returned to the basic shape at the angle before the rotation after the smart device 100*b* is rotated at the predetermined angle, the user can manipulate the function changed by the swivel operation. An elastic member is disposed on the connection link so as to return the smart device to the basic shape after the swivel operation.

Figure 8A:
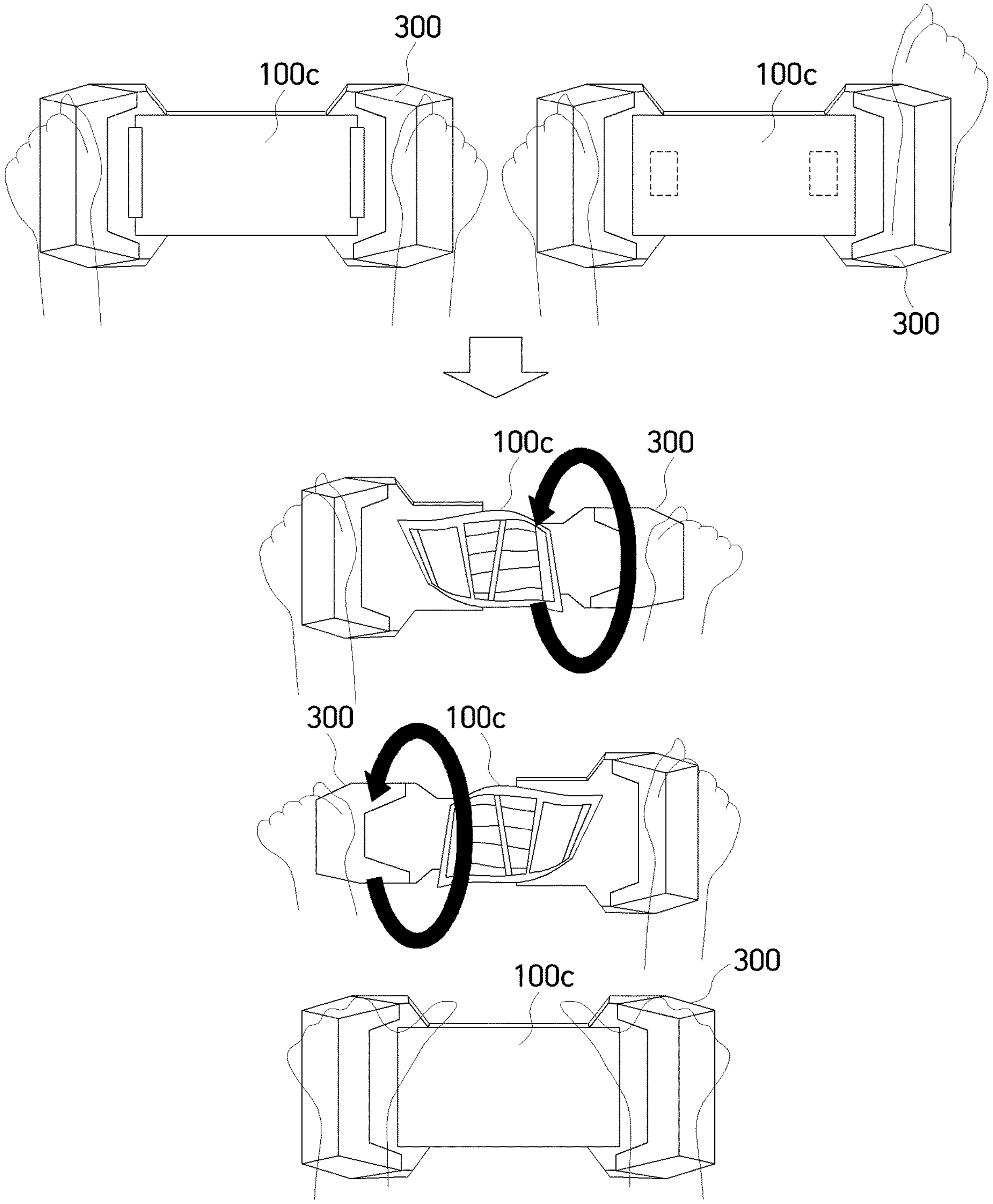
Figure 8B:
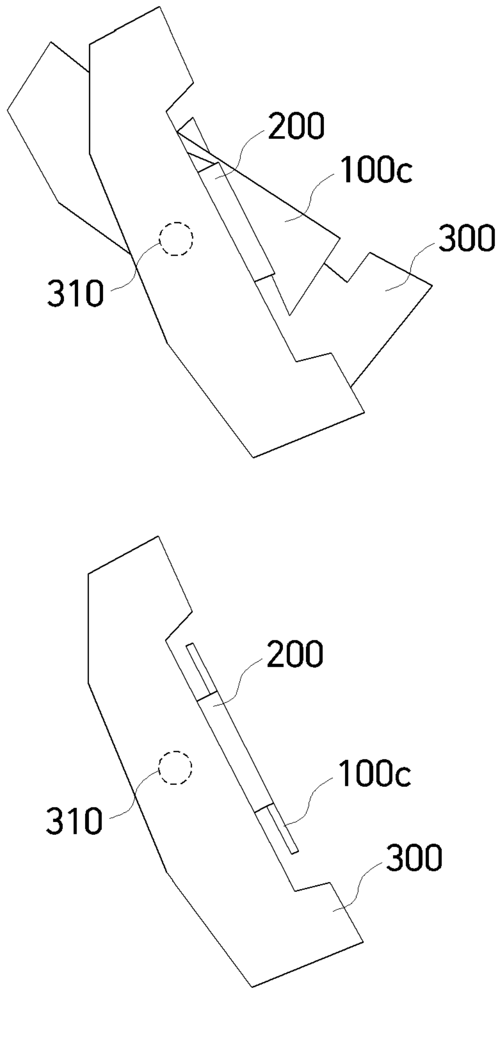

Referring to FIG. 8, the user grabs the steering wheel 300 having the smart device 100*c* mounted thereon, and performs a swivel operation.

The smart device 100*c* is a flexible smart device, and is mounted on the steering wheel 300 by the holder 200.

The user can perform a swivel operation on the smart device 100*c* by twisting the wrist joints of both hands of the user who grabs the steering wheel 300.

At this time, since the user swivels the steering wheel 300 itself having the smart device 100*c* mounted thereon, the steering wheel 300 having the smart device 100*c* mounted thereon by the holder 200 includes a rotating part 310.

The user rotates the steering wheel 300 and the smart device 100*c* at a predetermined angle by performing a swivel operation on the steering wheel 300 and the smart device 100*c*, with the smart device 100*c* mounted on the steering wheel 300. With the steering wheel 300 and the smart device 100*c* returned to the basic shapes at the angle before the rotation after the steering wheel 300 and the smart device 100*c* are rotated at the predetermined angle, the user manipulates a function changed by the swivel operation. An elastic member is included in the rotating part 310, in order to return the steering wheel 300 to the basic shape.

In accordance with the embodiment of the present disclosure, a swivel state is recognized by a swivel rotating part sensor (e.g., potentiometer, encoder or angle sensor) applied to the front/rear of a smart device holder.

Furthermore, a gyro sensor included in the smart device itself is used to recognize a signal for a front/rear swivel operation.

When the smart device is a flexible display device, the contraction and expansion of a twisted area formed by twisting a flexible display screen is recognized in order to recognize the swivel state of the smart device.

A service agent receives an accelerometer (Y=−170+8.49/0+0.33/+170−8.87) and gravity (Y=+7.75~Y=−7.75), normalizes values of −170 to +170 to a range value, and transmits angle range data (e.g., ROTATE 0 to ROTATE 1024) to middleware.

The middleware transmits an e-corner control value to an e-corner module, and the e-corner module is rotated on the basis of the received range value.

While a steering wheel angle is decided, a gyro sensor signal input value for a steering operation is decided. Thus, the swivel state can be recognized through a change in gyro sensing value for a front/rear swivel operation, in addition to a preset value. In this case, the change in gyro sensing value is the largest in a Z-axis direction.

Figure 9A:
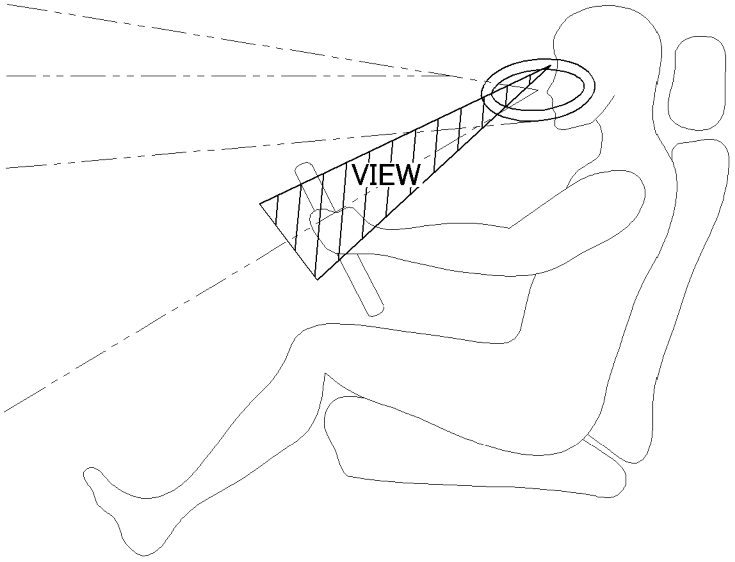
Figure 9B:
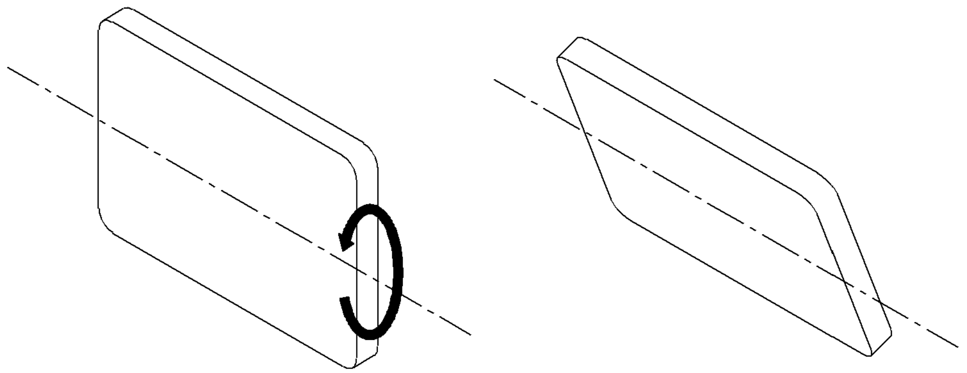
Figure 9C:
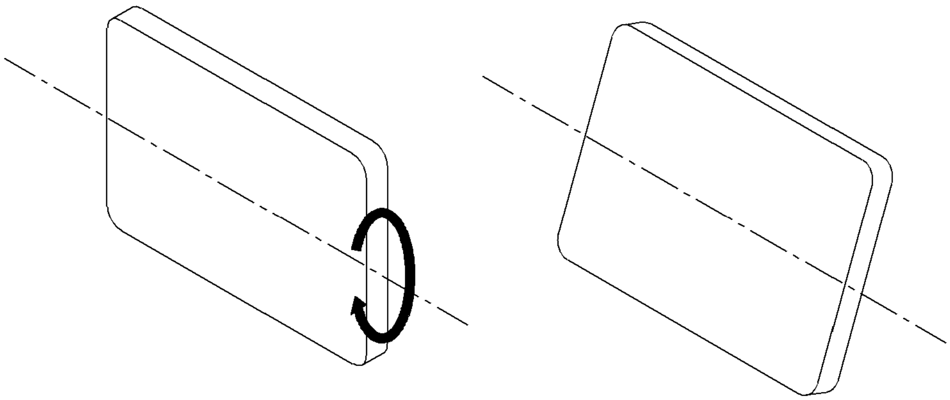

Referring to FIGS. 9A to 9C, the angle at which the smart device and the steering wheel are swiveled is adjusted within a preset operation range, such that the view and visibility of a driver are not disturbed.

As illustrated in FIGS. 9A to 9C, the smart device and the steering wheel are swiveled in the counterclockwise direction toward the driver within the preset operation range, or swiveled in the clockwise direction away from the driver within the preset operation range.

Figure 10:
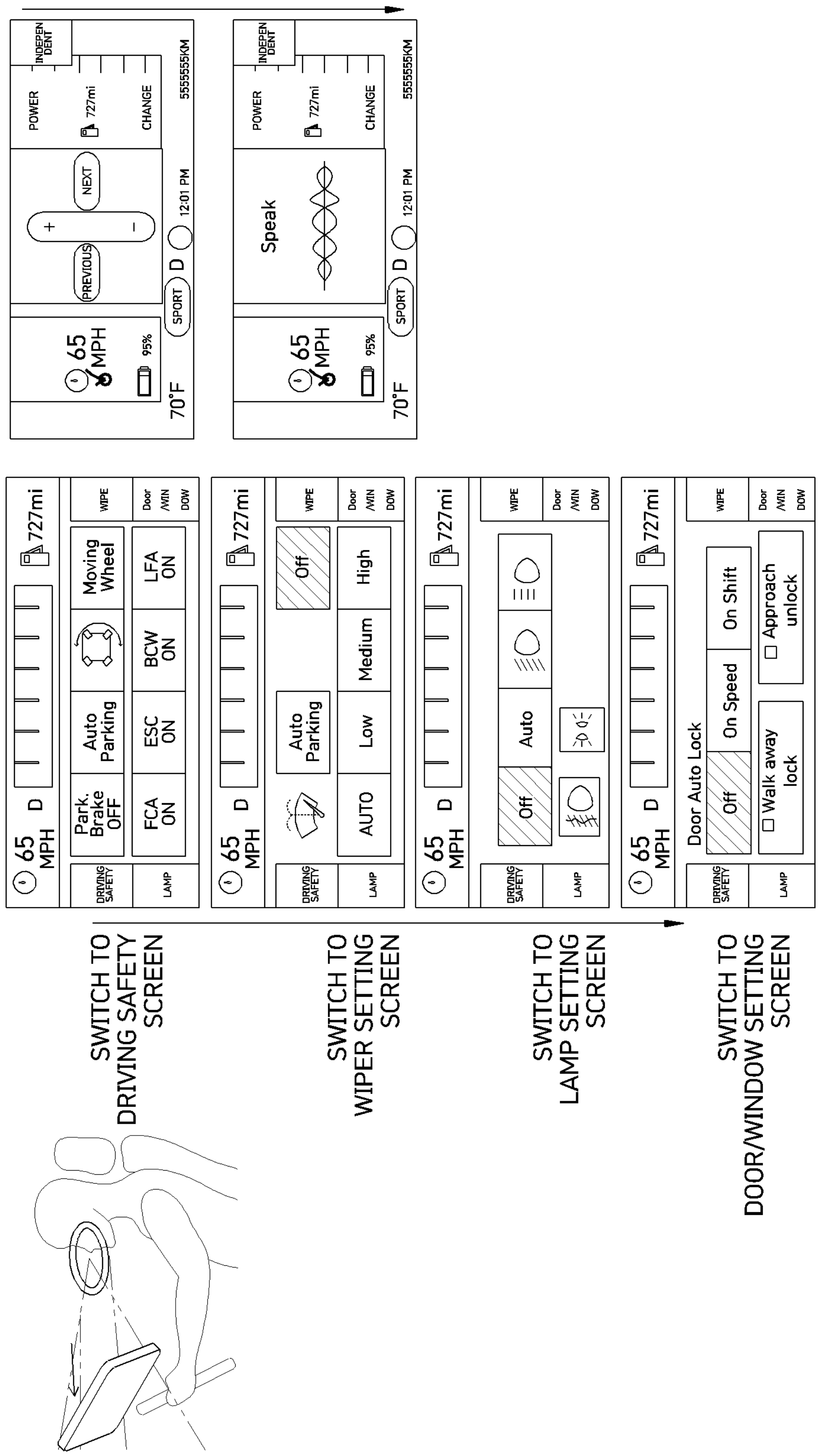
FIGS. 10 to 12 illustrate a UI architecture configured by the swivel operation on the smart device in accordance with the embodiment of the present disclosure.
Figure 11:
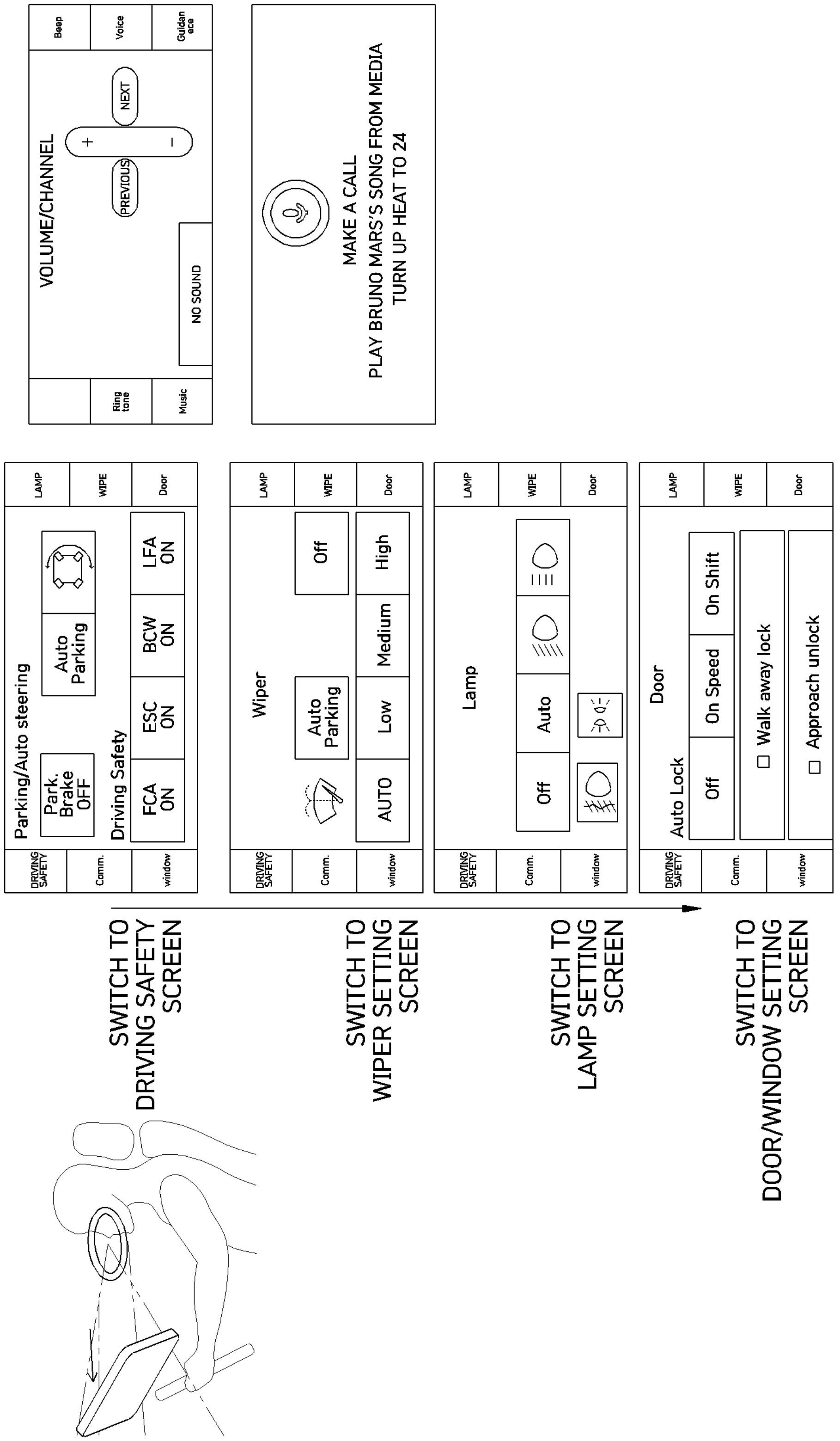
Figure 12:
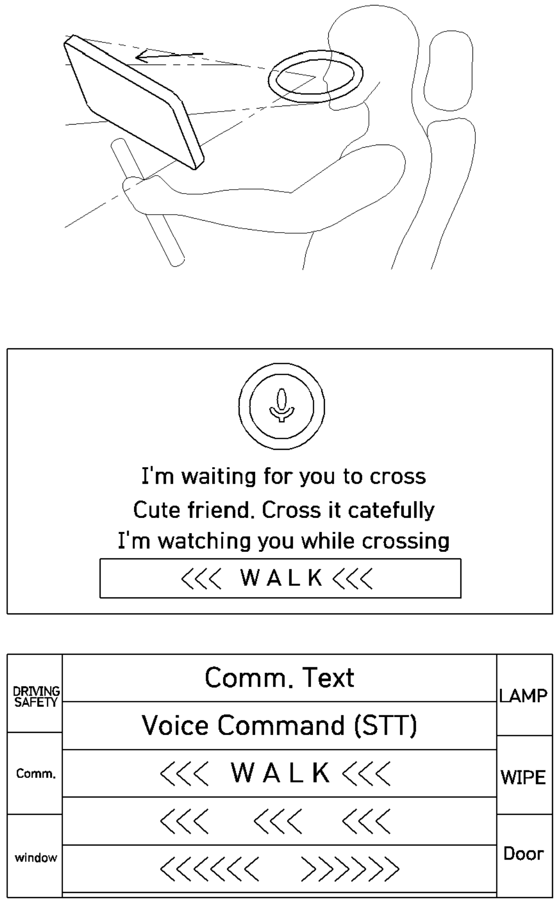

FIGS. 10 to 12 illustrate a UI architecture configured by a swivel operation on the smart device in accordance with the embodiment of the present disclosure.

FIG. 10 illustrates that display information is changed according to the swivel direction of the smart device within the steering wheel. In such a case, the screen of the smart device is changed to a driving safety screen, wiper setting screen, lamp setting screen, or door/window setting screen.

In accordance with the embodiment of the present disclosure, manipulation setting can be performed on the basis of a focused area on an internal display of a vehicle. FIG. 10 illustrates an example in which a cluster area is focused.

FIG. 11 illustrates that display information is changed according to the swivel direction of the smart device within the steering wheel. In such a case, the screen of the smart device is changed to a driving safety screen, wiper setting screen, lamp setting screen, or door/window setting screen.

In accordance with the embodiment of the present disclosure, manipulation setting can be performed on the basis of a focused area on the internal display of the vehicle. FIG. 11 illustrates an example in which an area App1 (volume/channel control area) and an area App2 (voice recognition area) are focused, when the internal display is divided into preset areas.

FIG. 12 illustrates that display information is changed according to the swivel direction of the smart device within the steering wheel, and a voice command screen for a message to be displayed on an external display of the vehicle is provided when the vehicle is stopped.

Figure 13:
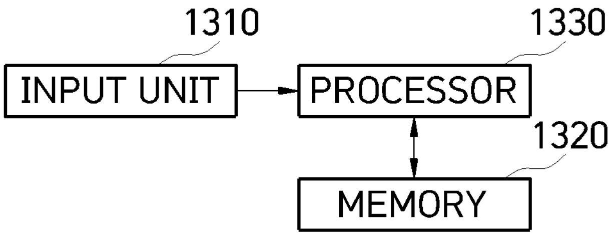
FIG. 13 illustrates a vehicle control system using a swivel operation of a smart device in accordance with an embodiment of the present disclosure.

FIG. 13 illustrates a vehicle control system using a swivel operation of a smart device in accordance with an embodiment of the present disclosure.

The vehicle control system using a swivel operation of a smart device in accordance with the preset disclosure includes an input unit 1310 configured to receive swivel data or information of a smart device within a vehicle, a memory 1320 configured to store a program for displaying a vehicle function control screen by using the swivel information, and a processor 1330 configured to execute the program. The processor 1330 changes and displays the vehicle function control screen by using the swivel information.

The input unit 1310 receives the swivel information of the smart device, as a swivel rotating part included in a holder is rotated.

The input unit 1310 receives swivel information of a partial area of the smart device by the rotation of a connection link included in the smart device.

The input unit 1310 receives swivel information acquired by a twist of the screen of the smart device including a flexible display.

When the smart device including the flexible display is mounted on a steering wheel including a rotating part, the input unit 1310 receives swivel information which is acquired as a driver grabs and rotates the steering wheel.

With the smart device rotated by the swivel operation, the processor 1330 changes and displays the vehicle function control screen.

With the smart device returned to the shape before the rotation after the smart device is rotated by the swivel operation, the processor 1330 transmits a function execution command according to a signal inputted through the vehicle function control screen.

Figure 14:
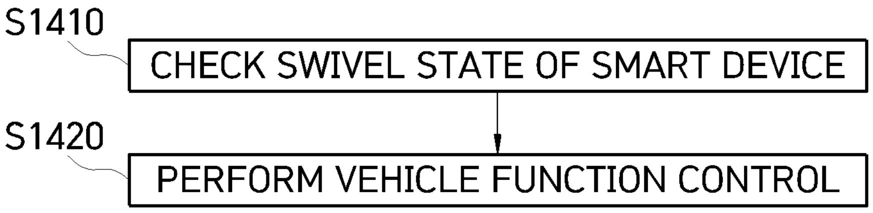
FIG. 14 illustrates a vehicle control method using a swivel operation of a smart device in accordance with an embodiment of the present disclosure.

FIG. 14 illustrates a vehicle control method using a swivel operation of a smart device in accordance with an embodiment of the present disclosure.

The vehicle control method using a swivel operation of a smart device includes step S1410 of acquiring swivel information by checking a swivel state of a smart device and step S1420 of changing and displaying a vehicle function control screen according to the swivel state.

Step S1410 includes receiving the swivel information of the smart device, as a swivel rotating part included in a holder is rotated.

Step S1410 includes receiving swivel information of a partial area of the smart device by the rotation of a connection link included in the smart device.

Step S1410 includes receiving swivel information acquired by a twist of the screen of the smart device including a flexible display.

Step S1420 includes changing and displaying a vehicle function control screen, with the smart device rotated by the swivel operation.

Step S1420 includes transmitting a function execution command according to a signal inputted through the vehicle function control screen, with the smart device returned to the shape before the rotation after the smart device is rotated by the swivel operation.

The vehicle control method using a swivel operation of a smart device in accordance with the embodiment of the present disclosure may be implemented in a computer system or recorded in a recording medium. The computer system may include one or more processors, a memory, a user input device, a data communication bus, a user output device and a storage place. The above-described components perform data communication through the data communication bus.

The computer system may further include a network interface coupled to a network. The processor may be a CPU (Central Processing Unit), or a semiconductor device configured to process a command stored in the memory and/or the storage place.

The memory and the storage place may include various types of volatile or nonvolatile storage media. Examples of the memory may include a ROM (Read Only Memory) and RAM (Random Access Memory).

Therefore, the vehicle control method using a swivel operation of a smart device in accordance with the embodiment of the present disclosure may be implemented as a method which can be executed in a computer. When the vehicle control method using a swivel operation of a smart device in accordance with the embodiment of the present disclosure is performed in a computer device, computer-readable commands may perform the vehicle control method in accordance with the embodiment of the present disclosure.

The vehicle control method using a swivel operation of a smart device in accordance with the embodiment of the present disclosure may be implemented as computer-readable codes in a computer-readable recording medium. The computer-readable recording medium includes all types of recording media storing data which can be read by a computer system. Examples of the computer-readable recording media may include a ROM, RAM, magnetic tape, magnetic disk, flash memory, optical data storage device and the like. Furthermore, the computer-readable recording media may be stored and executed as codes which are distributed to computer systems connected through a computer communication network and read in a distributed manner.

What is claimed is:

1. A system for displaying various vehicle function control screens on a display of a vehicle, comprising:
a user interaction device removably mounted on a holder in the vehicle and configured to swivel with respect to a fixed axis when a force is applied by a user to the user interaction device;
a processor; and
a computer-readable medium in communication with the processor and storing instructions that, when executed by the processor, cause the processor to control the vehicle control system to perform:
displaying, on the display, a first vehicle function control screen including a first set of vehicle control functions;
receiving, from the user interaction device, swivel data indicating swiveling of the user interaction device with respect to the fixed axis; and
in response to receiving the swivel data, changing the first vehicle function control screen displayed on the display to a second vehicle function control screen including a second set of vehicle control functions.

2. The system of claim 1, wherein the user interaction device is configured to perform a steering wheel function of the vehicle.

3. The system of claim 1, wherein:
the user interaction device comprises a connection link configured to function as the fixed axis; and
at least a portion of the user interaction device swivels with respect to the connection link.

4. The system of claim 1, wherein the user interaction device is configured to swivel by rotation with respect to the fixed axis.

5. The system of claim 1, wherein the instructions, when executed by the processor, further cause the processor to control the vehicle control system to perform:
receiving a user input via the first or second vehicle function control screen displayed on the display; and
transmitting a function execution command corresponding to the received user input.

6. The system of claim 1, wherein the user interaction device is configured to return to an initial shape after swiveling.

7. A method of operating a system for displaying various vehicle function control screens on a display of a vehicle, the vehicle including a user interaction device removably mounted on a holder in the vehicle and configured to swivel with respect to a fixed axis when a force is applied by a user to the user interaction device, the method comprising:
displaying, on the display, a first vehicle function control screen including a first set of vehicle control functions;
receiving, from the user interaction device, swivel data indicating swiveling of the user interaction device with respect to the fixed axis; and
in response to receiving the swivel data the first vehicle function control screen displayed on the display to a second vehicle function control screen including a second set of vehicle control functions.

8. The method of claim 7, wherein the user interaction device is configured to perform a steering wheel function of the vehicle.

9. The method of claim 7, wherein:
the user interaction device comprises a connection link configured to function as the fixed axis, and
at least a portion of the user interaction device swivels with respect to the connection link.

10. The method of claim 7, wherein the user interaction device is configured to swivel by rotation with respect to the fixed axis.

11. The method of claim 7, further comprising:
receiving a user input via the first or second vehicle function control screen[;] displayed on the display; and
transmitting a function execution command corresponding to the received user input.

12. The method of claim 7, wherein the user interaction device is configured to return to an initial shape after swiveling.

* * * * *